United States Patent
Harasawa et al.

(10) Patent No.: US 8,681,451 B2
(45) Date of Patent: Mar. 25, 2014

(54) MAGNETIC TAPE AND METHOD OF MANUFACTURING THE SAME, AND MAGNETIC RECORDING DEVICE

(75) Inventors: Takeshi Harasawa, Minami-ashigara (JP); Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 13/427,635

(22) Filed: Mar. 22, 2012

(65) Prior Publication Data

US 2012/0243120 A1    Sep. 27, 2012

(30) Foreign Application Priority Data

Mar. 25, 2011    (JP) ................................. 2011-067548

(51) Int. Cl.
*G11B 5/706*    (2006.01)
(52) U.S. Cl.
USPC ............................................................ 360/90
(58) Field of Classification Search
USPC ................. 360/90, 92.1, 70, 75, 71
See application file for complete search history.

(56) References Cited

U.S. PATENT DOCUMENTS

| | | | |
|---|---|---|---|
| 6,521,361 | B2 | 2/2003 | Ejiri et al. |
| 6,620,499 | B2 | 9/2003 | Masaki |
| 6,689,455 | B2 | 2/2004 | Masaki |
| 6,727,009 | B2 | 4/2004 | Masaki et al. |
| 6,773,788 | B2 | 8/2004 | Mori et al. |
| 2002/0018915 | A1 | 2/2002 | Ejiri et al. |
| 2002/0045067 | A1 | 4/2002 | Masaki et al. |
| 2002/0164504 | A1 | 11/2002 | Masaki |
| 2003/0049490 | A1 | 3/2003 | Masaki |
| 2003/0113585 | A1 | 6/2003 | Mori et al. |
| 2009/0098414 | A1 | 4/2009 | Ooishi et al. |
| 2013/0184426 | A1* | 7/2013 | Omura et al. ................. 528/44 |

FOREIGN PATENT DOCUMENTS

| | | |
|---|---|---|
| JP | 03-292617 A | 12/1991 |
| JP | 04-178916 A | 6/1992 |
| JP | 04-236404 A | 8/1992 |
| JP | 05-144615 A | 6/1993 |
| JP | 05-283218 A | 10/1993 |
| JP | 07-057242 A | 3/1995 |
| JP | 2001-297423 A | 10/2001 |
| JP | 2002-074640 A | 3/2002 |
| JP | 2002-197639 A | 7/2002 |
| JP | 2002-260211 A | 9/2002 |
| JP | 2002-260212 A | 9/2002 |
| JP | 2002-298333 A | 10/2002 |
| JP | 2002-329309 A | 11/2002 |
| JP | 2002-373413 A | 12/2002 |
| JP | 2003-059026 A | 2/2003 |
| JP | 2009-099240 A | 5/2009 |

OTHER PUBLICATIONS

Office Action dated Mar. 5, 2013 in Japanese Application No. 2011-067548.

* cited by examiner

*Primary Examiner* — Allen T Cao
(74) *Attorney, Agent, or Firm* — Sughrue Mion, PLLC

(57) ABSTRACT

An aspect of the present invention relates to a magnetic tape comprising a magnetic layer containing a ferromagnetic powder and a binder on a nonmagnetic support, wherein
the ferromagnetic powder is a hexagonal ferrite powder,
squareness in a vertical direction without demagnetizing field correction of the magnetic layer ranges from 0.6 to 1.0, and
the magnetic layer further comprises a compound in which a substituent selected from the group consisting of a carboxyl group and a hydroxyl group is directly substituted into a ring structure comprising a double bond and having a ClogP falling within a range of 2.3 to 5.5.

10 Claims, No Drawings

MAGNETIC TAPE AND METHOD OF MANUFACTURING THE SAME, AND MAGNETIC RECORDING DEVICE

CROSS-REFERENCE TO RELATED APPLICATIONS

This application claims the benefit of priority under 35 USC 119 to Japanese Patent Application No. 2011-067548 filed on Mar. 25, 2011, which is expressly incorporated herein by reference in its entirety.

BACKGROUND OF THE INVENTION

1. Field of the Invention

The present invention relates to a magnetic tape and to a method of manufacturing the same. More particularly, it relates to a magnetic tape affording both good electromagnetic characteristics and good recording retention property, and to a method of manufacturing the same.

The present invention further relates to a magnetic recording device comprising the above magnetic tape.

2. Discussion of the Background

As the quantity of recorded information has increased, ever higher recording densities have been demanded of magnetic recording media. Accordingly, to achieve high-density recording, the practice of increasing the fill rate of the magnetic layer by using microparticulate magnetic powders has been widely employed.

Conventionally, primarily ferromagnetic metal magnetic particles have come to be employed in the magnetic layer of magnetic recording media for high-density recording. However, a limit has begun to appear in the improvement of ferromagnetic metal magnetic particles to achieve higher density recording. By contrast, the coercive force of hexagonal ferrite magnetic particles is great enough for them to be used in permanent magnetic materials. Their magnetic anisotropy, which is the basis of this coercive force, derives from their crystalline structure. Thus, it is possible to maintain the coercive force even when the particles are reduced in size. Further, magnetic recording media with magnetic layers in which hexagonal ferrite magnetic particles are employed can exhibit high-density characteristics based on the vertical component. Thus, hexagonal ferrite magnetic particles are a ferromagnetic magnetic material that is suited to achieving higher densities.

However, since hexagonal ferrite magnetic materials are tabular in form, in contrast to ferromagnetic magnetic particles, which are acicular in form, and since they have an easily magnetized axis in a direction perpendicular to the tabular surface thereof, they tend to undergo stacking (a state where the magnetic particles aggregate like the beads of an abacus). When the magnetic particles aggregate, a state similar to that of coarse particles being present in the magnetic layer is created, even with microparticles. The noise increases, causing the SNR to drop. As a countermeasure, attempts have been made to prevent aggregation (stacking) of the particles by increasing the dispersion of hexagonal ferrite. In this context, reference can be made to Japanese Unexamined Patent Publication (KOKAI) Heisei No. 4-178916 (Reference 1), Japanese Unexamined Patent Publication (KOKAI) Heisei No. 5-283218 (Reference 2), Japanese Unexamined Patent Publication (KOKAI) Heisei No. 5-144615 (Reference 3), Japanese Unexamined Patent Publication (KOKAI) No. 2002-298333 (Reference 4) or English language family members US 2003/049490A1 and U.S. Pat. No. 6,689,455 B2, and Japanese Unexamined Patent Publication (KOKAI) No. 2009-099240 (Reference 5) or English language family member US 2009/098414 A1, and Japanese Unexamined Patent Publication (KOKAI) No. 2002-373413 (Reference 6), which are expressly incorporated herein by reference in their entirety.

Further, when the size of the magnetic particles is reduced, the energy maintaining the magnetic particles in the direction of magnetization (magnetic anisotropy energy) tends to be difficult to overcome thermal energy, and so-called thermal fluctuation ends up causing recording retention property to drop. Attempts have been to resolve this, primarily by increasing the thermal stability of the magnetic powder. In this context, reference can be made to Japanese Unexamined Patent Publication (KOKAI) No. 2001-297423 (Reference 7) or English language family members US 2002/018915 A1 and U.S. Pat. No. 6,521,361 B2, Japanese Unexamined Patent Publication (KOKAI) No. 2003-059026 (Reference 8) or English language family members US 2003/113585 A1 and U.S. Pat. No. 6,773,788 B2, Japanese Unexamined Patent Publication (KOKAI) No. 2002-260211 (Reference 9) or English language family members US 2002/164504 A1 and U.S. Pat. No. 6,620,499 B2, Japanese Unexamined Patent Publication (KOKAI) No. 2002-260212 (Reference 10), Japanese Unexamined Patent Publication (KOKAI) No. 2002-074640 (Reference 11) or English language family members US 2002/045067 A1 and U.S. Pat. No. 6,727,009 B2, and Japanese Unexamined Patent Publication (KOKAI) Heisei No. 4-236404 (Reference 12), which are expressly incorporated herein by reference in their entirety.

SUMMARY OF THE INVENTION

As set forth above, it is demanded for magnetic recording media for high-density recording to raise the SNR and improve thermal stability.

Accordingly, the present invention provides for a magnetic recording medium with high thermal stability that is capable of achieving a high SNR.

The present inventors conducted extensive research, resulting in the following discoveries.

The need to suppress aggregation (stacking) to enhance the SNR is common technical knowledge in the field of magnetic recording media containing ferromagnetic powder in the form of hexagonal ferrite powder. For example, above References 1 to 6 propose the suppression of aggregation (stacking).

By contrast, the present inventors have presumed a mechanism that runs counter to conventional wisdom, whereby the SNR is enhanced by causing hexagonal ferrite magnetic particles to stack so that they align in the direction of thickness of the tape in magnetic tapes. The present inventors presume that among hexagonal ferrite magnetic particles that align in the direction of thickness of the tape, there is only weak magnetic interaction between particles in the longitudinal direction of the tape. Thus, the noise component spreads little during recording, enhancing the SNR. Additionally, since there is strong magnetic interaction between particles in the direction of thickness of the tape, thermal stability increases.

The present inventors conducted extensive trial and error based on this new knowledge. As a result, they discovered that by vertically orienting a magnetic layer—comprising, in addition to hexagonal ferrite powder, a compound in which a substituent selected from the group consisting of a carboxyl group and a hydroxyl group is directly substituted into a ring structure comprising a double bond and having a ClogP falling within a range of 2.3 to 5.5—so that the squareness in the vertical direction without demagnetizing field correction fell within a range of 0.6 to 1.0, it was possible to enhance both the SNR and thermal stability. In a state in which a component with a markedly high effect of blocking the magnetic interaction between particles was present between the magnetic particles, even when a vertical orientation treatment was conducted, the magnetic particles were thought to be randomly present in a highly dispersed state. Increasing the dispersion of the magnetic particles in this manner and causing them to be present in the magnetic layer without aggregation (stacking) has conventionally been thought to enhance the SNR. However, the adsorptive force exerted by the above compound on the hexagonal ferrite magnetic particles was appropriate. Thus, the particles could magnetically interact during vertical orientation processing, and its alignment was thought to be promoted by the attraction (π-π interaction) between ring structures having double bonds without preventing alignment in the direction of thickness of the tape. The present inventors thought that it was possible to enhance both the SNR and thermal stability because the hexagonal ferrite magnetic particles could be made to stack by vertical orientation processing so that they aligned in the direction of thickness of the tape.

The present invention as set forth above clearly differs from the conventional technical wisdom, and was devised by the present inventors based on this new knowledge.

An aspect of the present invention relates to a magnetic tape comprising a magnetic layer containing a ferromagnetic powder and a binder on a nonmagnetic support, wherein the ferromagnetic powder is a hexagonal ferrite powder, squareness in a vertical direction without demagnetizing field correction of the magnetic layer ranges from 0.6 to 1.0, and the magnetic layer further comprises a compound in which a substituent selected from the group consisting of a carboxyl group and a hydroxyl group is directly substituted into a ring structure comprising a double bond and having a ClogP falling within a range of 2.3 to 5.5.

The magnetic tape may be a longitudinal recording magnetic tape.

The magnetic layer may have a negative value of a magnetic interaction, ΔM, calculated by equation (1) below:

$$\Delta M = (Id(H) + 2Ir(H) - Ir(H)(\infty))/Ir(\infty) \quad (1)$$

wherein, Id(H) denotes residual magnetization measured with direct current (DC) demagnetization, Ir(H) denotes residual magnetization measured with alternate current (AC) demagnetization, Ir(∞) denotes residual magnetization measured at an applied magnetic field of 796 kA/m, approximately 10 kOe.

The magnetic layer may have the ΔM of equal to or less than 0.05.

The above ring structure may be selected from the group consisting of a naphthalene ring, a biphenyl ring, an anthracene ring, and a pyrene ring.

The above compound may be selected from the group consisting of dihydroxynaphthalene, biphenylcarboxylic acid, anthraquinonecarboxylic acid, pyrenecarboxylic acid, and hydroxynaphthalene.

The average plate diameter of the hexagonal ferrite powder may range from 10 nm to 30 nm.

The magnetic layer may comprise the above compound in a quantity of 1 to 20 weight parts per 100 weight parts of the hexagonal ferrite powder.

A further aspect of the present invention relates to a method of manufacturing a magnetic tape, which comprises:

preparing a coating liquid by dispersing a magnetic liquid containing a hexagonal ferrite powder, a binder, and a compound in which a substituent selected from the group consisting of a carboxyl group and a hydroxyl group is directly substituted into a ring structure comprising a double bond and having a ClogP falling within a range of 2.3 to 5.5, forming a magnetic layer by coating the coating liquid that has been prepared on a nonmagnetic support, and adjusting squareness in a vertical direction without demagnetizing field correction of the magnetic layer to within a range of 0.6 to 1.0 by implementing vertical orientation processing, to manufacture the magnetic tape of the present invention.

The method of manufacturing a magnetic tape may further comprise preparing the magnetic liquid by preparing a mixture of a hexagonal ferrite powder and a binder and adding the compound to the mixture.

A still further aspect of the present invention relates to a magnetic recording device, which comprises the magnetic tape according to claim 1 and a longitudinal recording magnetic head.

The present invention can provide a magnetic tape for high-density recording affording a good recording retention property.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The present invention relates to a magnetic tape comprising a magnetic layer containing a ferromagnetic powder and a binder on a nonmagnetic support, wherein the ferromagnetic powder is a hexagonal ferrite powder, squareness in a vertical direction without demagnetizing field correction of the magnetic layer ranges from 0.6 to 1.0, and the magnetic layer further comprises a compound in which a substituent selected from the group consisting of a carboxyl group and a hydroxyl group is directly substituted into a ring structure comprising a double bond and having a ClogP falling within a range of 2.3 to 5.5. Thus, as set forth above, it is possible to enhance both the SNR and the thermal stability.

The present invention will be described in greater detail below.

In addition to the hexagonal ferrite powder, the magnetic layer comprises a compound in which a substituent selected from the group consisting of a carboxyl group and a hydroxyl group is directly substituted into a ring structure comprising a double bond and having a ClogP falling within a range of 2.3 to 5.5. This compound will be described in detail below.

The above compound has a ring structure comprising a double bond, thus making it possible to reduce noise and enhance thermal stability. This is presumed to occur because the magnetic field orientation and the attraction ($\pi$-$\pi$ interaction) between ring structures of the compound present between the hexagonal ferrite magnetic particles in the magnetic layer cause the hexagonal ferrite magnetic particles to align (stack) in the direction of thickness of the tape. By contrast, in ring structures without double bonds, even when the other conditions are satisfied, it is difficult to enhance both the SNR and thermal stability. That is thought to occur because inadequate interaction between ring structures causes the hexagonal ferrite magnetic particles, even when subjected to vertical orientation processing, to tend not to align (stack) in the direction of thickness of the tape. Since a $\pi$-$\pi$ interaction can develop when just one double bond is present in the ring structure, it suffices for at least one double bond to be present in the ring structure, and the number thereof is not specifically limited.

In addition to the condition of comprising a double bond, the ring structure contained in the compound also satisfies the condition of a ClogP falling within a range of 2.3 to 5.5. In this context, the term "ClogP" means the logP (log [water/octanol partition coefficient]) that is estimated for the chemical structure by calculation. In the present invention, the ClogP of the ring structure refers to the ClogP of the ring structure without substituents. A number of methods of estimation based on calculation of the logP of the chemical structure have been developed. In Examples further below, the value calculated by Chem Draw Pro 12.0 is employed. ClogP is an index of the hydrophobic/hydrophilic property. A positive value indicates a hydrophilic property, and a negative value a hydrophobic property. The higher the value, the more intense the property. The above compound comprises a ring structure in which ClogP falls within the above-stated range in addition to comprising an adsorption functional group in the form of a substituent selected from the group consisting of a hydroxyl group and a carboxyl group. Thus, the compound lying between the hexagonal ferrite magnetic particles can prevent strongly aggregating of the particles. By contrast, a compound with a ring structure ClogP exceeding 2.3 will exhibit an inadequate inhibiting effect on the aggregation of particles, even when it satisfies the other conditions. When the particles strongly aggregate, it is not possible to cause the particles to undergo orientation in the direction of thickness of the tape by eliminating the aggregation between particles, even when subjected to vertical orientation processing. As a result, it is thought to be difficult to enhance the SNR and thermal stability. By contrast, a compound that satisfies the other conditions but that has a ring structure exceeding ClogP will have an excessively strong adsorptive force on the hexagonal ferrite magnetic particles, impeding alignment in the direction of thickness of the tape by magnetic particles when subjected to vertical orientation processing. As a result, it is thought difficult to enhance both the SNR and thermal stability. For these reasons, the ClogP of the compound contained in the magnetic layer of the magnetic tape of the present invention is set to a range of 2.3 to 5.5, desirably to a range of 2.5 to 4.0.

So long as the ring structure contained in the compound satisfies both of the above conditions, it can be a monocyclic structure or a polycyclic structure, and a carbon ring or a hetero ring. When a polycyclic structure, it can be a condensed ring or a ring set in which two or more rings are linked by single bonds or linking groups. Specific examples of the ring structure are: naphthalene rings, biphenyl rings, anthracene rings, pyrene rings, and phenanthrene rings. Desirable examples of ring structures are naphthalene rings, biphenyl rings, anthracene rings, and pyrene rings.

In the compound contained in the magnetic layer, a substituent selected from the group consisting of a carboxyl group and a hydroxyl group is directly substituted into the ring structure set forth above. By having a substituent selected from the group consisting of a hydroxyl group and a carboxyl group, it is suitably adsorbed onto the hexagonal ferrite magnetic particles, inhibiting aggregation. However, it is difficult to achieve the effects of enhancing the SNR and thermal stability with a compound having a functional group of strong adsorptive strength as a substituent, such as a sulfonic acid group or a salt thereof. This is presumed to be because, due to strong adsorption to the hexagonal ferrite magnetic particle, the magnetic particles are hindered from aligning in the direction of the tape in the course of vertical orientation processing, making it difficult to enhance the SNR and the thermal stability. Further, a strongly hydrophilic group such as a sulfonic acid group or a salt thereof is undesirable in that it will associate in the course of dispersion, ultimately promoting the aggregation of particles.

The number of substituents selected from the group consisting of a hydroxyl group and a carboxyl group that are contained in the compound can be one, two, three or more. One or two are desirable to develop a suitable adsorptive force.

The above compound can comprise other substituents in addition to the substituent selected from the group consisting of a hydroxyl group and a carboxyl group. Such substituents are not specifically limited. Examples are halogen atoms (such as fluorine atoms, chlorine atoms, bromine atoms, and iodine atoms) and alkyl groups. However, for the reasons given above, it is undesirable for substituents exhibiting greater adsorption than a hydroxyl group and a carboxyl group to be present. The presence of substituents with a great hydrophobic effect on the compound is also undesirable. From these perspectives, the compound desirably does not contain a substituent other than the substituent selected from the group consisting of a hydroxyl group and a carboxyl group.

Specific desirable examples of the compound set forth above are dihydroxynaphthalene, biphenylcarboxylic acid, anthraquinonecarboxylic acid, pyrenecarboxylic acid, hydroxynaphthalene, and naphthalanecarboxylic acid.

In the present invention, the squareness in the vertical direction without demagnetizing field correction is specified as falling within a range of 0.6 to 1.0 for the magnetic layer containing the compound in addition to the hexagonal ferrite powder. The squareness in the vertical direction can be controlled by conducting orientation processing in the vertical direction. By conducting magnetic field orientation in the vertical direction so that the squareness in the vertical direction is equal to or greater than 0.6, it is possible to enhance the SNR and thermal stability. This is thought to result because it is possible to align (stack) the hexagonal ferrite magnetic particles in the direction of thickness of the tape. In principle, the upper limit of the squareness in the vertical direction is 1.0. From the perspective of enhancing the SNR, the squareness in the vertical direction is desirably equal to or greater than 0.7. The magnetic layer can be formed by coating a magnetic layer-forming coating liquid on a surface being coated, and then immediately passing the coating between magnets disposed with their same poles opposed while simultaneously drying the coating by blowing hot air. By suitably adjusting the strength of the magnets, volume of air, temperature, and coating rate, it is possible to form a magnetic layer having squareness in the vertical direction falling within the desired range.

As set forth above, the reason why it is possible to achieve both enhanced SNR and thermal stability in the present invention is presumed to be that the particles of hexagonal ferrite powder stack so as to align in the direction of thickness of the tape. In this context, the magnetic interaction, $\Delta M$, calculated by equation (1) below, is an example of an index relating to the stacking state.

$$\Delta M = (Id(H) + 2Ir(H) - Ir(\infty))/Ir(\infty) \quad (1)$$

In equation (1), $Id(H)$ denotes the residual magnetization measured with DC demagnetization. $Ir(H)$ denotes the residual magnetization measured with AC demagnetization. $Ir(\infty)$ denotes the residual magnetization measured at an applied magnetic field of 796 kA/m, approximately 10 kOe. $\Delta M$ becomes a positive value when the interaction between magnetic particles in the longitudinal direction (crosswise direction) of the tape is stronger than the interaction in the direction of thickness of the tape, and becomes a negative value when the opposite is true. The greater the absolute value thereof, the stronger the interaction between the magnetic particles in the corresponding direction, that is, the stronger the degree of alignment in the corresponding direction. As stated above, in the present invention, the fact that hexagonal ferrite magnetic particles are stacked in the direction of thickness of the tape is thought to contribute to enhancing the SNR and thermal stability. Thus, it is desirable for the interaction between magnetic particles to be greater in the direction of thickness of the tape than in the longitudinal direction of the tape. According, the $\Delta M$ of the magnetic layer is desirably negative. Further, as set forth above, the greater the degree of alignment in the direction of thickness of the tape, the better thermal stability and the less spreading of the noise component there is during recording, which is presumed to enhance the SNR. From this perspective, the greater the absolute value of $\Delta M$ when it is negative the better. From this perspective, it is desirable for the $\Delta M$ of the magnetic layer to be equal to or lower than −0.05. When the interaction between magnetic particles in the direction of the thickness of the tape becomes excessively strong, the actual volume of magnetization reversal increases, and noise increases. Thus, from the perspective of maintaining low noise, the $\Delta M$ of the magnetic layer is desirably equal to or greater than −0.30.

As set forth above, the $\Delta M$ of the magnetic layer indicates the degree of alignment (stacking state) of the hexagonal ferrite magnetic particles in the magnetic layer. Examples of factors affecting the stacking state are the compound containing a double bond and having a ring structure with a ClogP falling within a range of 2.3 to 5.5 that is directly substituted with a substituent selected from the group consisting of a hydroxyl group and a carboxyl group, and controlling the orientation state in the magnetic layer. From the perspective of effectively enhancing the SNR and thermal stability, the above compound is desirably employed in a proportion of 1 to 20 weight parts, preferably 1 to 10 weight parts, and more preferably, 3 to 8 weight parts, per 100 weight parts of hexagonal ferrite powder. Employing the above compound within the above desirable range can control the $\Delta M$ of the magnetic layer to within the desirable range. The force of magnetic alignment exerted on the magnetic particles in orientation processing can be controlled by means of the strength of the magnets, the amount and temperature of the hot air blown during drying, and the coating rate. By adjusting these factors, it is possible to keep the $\Delta M$ to within the desired range. By subjecting the magnetic layer in which the hexagonal ferrite magnetic particles have been suitably dispersed to vertical orientation processing while still wet, it is possible to cause the magnetic particles to align in the direction of thickness of the tape. From the perspective of readily achieving the desired $\Delta M$, it is desirable to achieve a suitable dispersion state in the magnetic layer-forming coating liquid such that the particle diameter in liquid measured in Examples set forth further below ranges from 40 to 60 nm. During the preparation of the magnetic layer-forming coating liquid, the compound containing a double bond and having a ring structure with a ClogP falling within a range of 2.3 to 5.5 that is directly substituted with a substituent selected from the group consisting of a hydroxyl group and a carboxyl group is subjected to a dispersion treatment in an organic solvent along with the hexagonal ferrite powder and a binder. In this context, the mixing order can be any of the following: (a) adding the compound and hexagonal ferrite powder and binder approximately simultaneously to the organic solvent; (b) mixing the compound with the hexagonal ferrite powder in advance, and then adding the binder; and (c) mixing the hexagonal ferrite powder and binder in advance and then adding the compound. From perspective of promoting the alignment of hexagonal ferrite magnetic particles in the direction of thickness of the tape by means of the attraction ($\pi$-$\pi$ interaction) between ring structures contained in the compound, (a) or (c) is desirable, and (c) is preferable. Any proportion of acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethyl formamide; and hexane can be employed as the organic solvent.

The hexagonal ferrite powder employed as the magnetic powder of the magnetic layer in the magnetic tape of the present invention will be described next.

Examples of hexagonal ferrite powders are barium ferrite, strontium ferrite, lead ferrite, calcium ferrite, and various substitution products thereof such as Co substitution products. The average plate diameter of the hexagonal ferrite is desirably 10 to 100 nm, preferably 10 to 60 nm, and more preferably, 10 to 30 nm. In particular, when employing a MR head for reproduction to increase the track density, it is desirable to achieve low noise. Thus, the average plate diameter is desirably equal to or less than 60 nm, preferably equal to or less than 30 nm. At less than 10 nm, stable magnetization cannot be expected, and at greater than 100 nm, noise is high, both of which are unsuited to high-density magnetic recording. The average plate thickness is desirably 4 to 15 nm. When the average plate thickness is equal to or greater than 4 nm, stable production is possible. When the average plate thickness is equal to or less than 15 nm, adequate orientation properties can be achieved. In a magnetic layer comprising microparticulate hexagonal ferrite of the above particle size, there is conventionally a problem in the form of reduced recording retention property due to thermal fluctuation. However, in the present invention, since the thermal stability can be enhanced as set forth above, good magnetic recording retention property can be achieved in a magnetic tape for high-density recording in which microparticulate hexagonal ferrite is employed.

A hexagonal ferrite of high coercive force Hc is advantageous for high-density recording, but this is limited by the capacity of the recording head. The Hc of the hexagonal ferrite employed in the present invention is desirably about 2,000 to about 4,000 Oe, approximately 160 to 320 kA/m. Reference can be made to paragraphs [0003] to [0037] in Japanese Unexamined Patent Publication (KOKAI) No. 2009-54270, for example, for details on the hexagonal ferrite that can be employed in the present invention. The content of the above publication is expressly incorporated herein by reference in its entirety.

The average plate diameter of the ferromagnetic powder can be measured by the following method.

Particles of hexagonal ferrite powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the plate diameter of the particles is measured with KS-400 image analyzer software from Carl Zeiss. The plate diameter of 500 particles is measured. The average value of the plate diameters measured by the above method is adopted as an average plate diameter of the ferromagnetic powder.

The size of a powder such as the hexagonal ferrite powder described further below (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

The magnetic tape of the present invention will be described in greater detail next.

The magnetic layer comprises a binder in addition to the hexagonal barium ferrite powder and the compound in which a substituent selected from the group consisting of a carboxyl group and a hydroxyl group is directly substituted into a ring structure comprising a double bond and having a ClogP falling within a range of 2.3 to 5.5. Polyurethane resins, polyester resins, polyamide resins, vinyl chloride resins, acrylic resins in which styrene, acrylonitrile, methyl methacrylate, and the like have been copolymerized, cellulose resins such as nitrocellulose, epoxy resins, phenoxy resins, polyvinyl acetals, polyvinyl butyral, and other polyvinyl alkyrals, can be employed independently or as mixtures of multiple resins as the binder that is contained in the magnetic layer. Of these, the polyurethane resins, acrylic resins, cellulose resins, and vinyl chloride resins are desirable. These resins can also be employed as binders in the nonmagnetic layer and backcoat layer described further below. Reference can be made to paragraphs [0029] to [0031] of Japanese Unexamined Patent Publication (KOKAI) No. 2010-24113, which is expressly incorporated herein by reference in its entirety, with regard to these binders. Polyisocyanate curing agents can be employed with these resins.

Additives can be added as needed to the magnetic layer. Suitable quantities of additives in the form of abrasives, lubricants, dispersing agents, dispersion adjuvants, fungicides, antistatic agents, oxidation inhibitors, solvents, carbon black, and the like can be suitably selected for use based on desired properties from among commercial products and products manufactured by known methods. Reference can be made to paragraph [0033] of Japanese Unexamined Patent Publication (KOKAI) No. 2010-24113 regarding carbon black.

The nonmagnetic layer will be described in detail next. In the magnetic tape of the present invention, a nonmagnetic layer comprising a nonmagnetic powder and a binder can be present between the nonmagnetic support and the magnetic layer. Both inorganic and organic substances can be employed as nonmagnetic powders in the nonmagnetic layer. Carbon black and the like can also be employed. Examples of inorganic substances are metals, metal oxides, metal carbonates, metal sulfates, metal nitrides, metal carbides, and metal sulfides. These nonmagnetic powders are commercially available, and can be manufactured by known methods. Reference can be made to paragraphs [0036] to [0039] of Japanese Unexamined Patent Publication (KOKAI) No. 2010-24113 for details.

The known techniques relating to the magnetic layer can be applied to the binder, lubricants, dispersing agent, additives, solvents, dispersion methods, and the like of the nonmagnetic layer. In particular, known techniques relating to magnetic layers can be applied for the quantity and type of binder, and the types and quantities of additives and dispersing agents added. Reference can be made to paragraphs [0040] to [0042] of Japanese Unexamined Patent Publication (KOKAI) No. 2010-24113, for example, in this regard.

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. In terms of the surface roughness of the nonmagnetic support that can be employed in the present invention, the support with a center average surface roughness Ra desirably ranges from 3 to 10 nm at a cutoff value of 0.25 mm.

As for the thickness structure of the magnetic recording medium of the present invention, the thickness of the nonmagnetic support preferably ranges from 3 to 80 µm. The thickness of the magnetic layer can be optimized based on the saturation magnetization of the magnetic head employed, the length of the head gap, and the recording signal band, and is normally 10 to 150 nm, preferably 20 to 120 nm, and more preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, preferably 0.3 to 2.0 µm, and more preferably, 0.5 to 1.5 µm in thickness. The nonmagnetic layer of the magnetic tape of the present invention can exhibit its effect so long as it is substantially nonmagnetic. It can exhibit the effect of the present invention, and can be deemed to have essentially the same structure as the magnetic tape of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

A backcoat layer can be provided on the opposite surface of the nonmagnetic support from the surface on which the magnetic layer is present in the magnetic tape of the present invention. Carbon black and an inorganic powder are desirably incorporated into the backcoat layer. The formula of the magnetic layer and nonmagnetic layer can be employed for the binder and various additives for forming the backcoat layer. The backcoat layer is desirably equal to or less than 0.9 µm, preferably 0.1 to 0.7 µm, in thickness.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the materials employed in the present invention may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. The order in which the hexagonal ferrite powder, binder, and the above-described compound are added in preparation of the magnetic layer-forming coating liquid is as set forth above. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic tape.

The present invention as set forth above can provide a magnetic tape having a magnetic layer in which hexagonal ferrite magnetic particles are stacked in the direction of thickness of the tape. The magnetic tape of the present invention can be employed in magnetic recording systems of the vertical recording type in which magnetic particles are magnetized in the direction of thickness of the tape, and in magnetic recording systems of the longitudinal type in which magnetic particles are magnetized in the longitudinal direction. A particularly marked enhancement in the SNR can be exhibited in longitudinal recording methods. That is presumed to be because when the hexagonal ferrite magnetic particles stack in the direction of thickness of the tape, magnetic interaction between particles in the longitudinal direction of the tape decreases, thereby reducing the spread of noise components within the tape, particularly in the longitudinal direction. Accordingly, the magnetic tape of the present invention is suitable as a magnetic tape for longitudinal recording. That is, a further aspect of the present invention is that it provides a magnetic recording device comprising the magnetic tape of the present invention and a magnetic head for longitudinal recording. Generally, in longitudinal magnetic recording methods, as shown in FIG. 7 of Fujitsu 52, 4, (07, 2001) 355, which is expressly incorporated herein by reference in its entirety, the easily magnetized axis is disposed in the longitudinal direction of the medium, so the magnetic head records with the longitudinal magnetic field of leakage flux of a ring head. A vertical magnetic recording method is a method of recording with the vertical magnetic field of a single-pole head, where a return path for the magnetic field of the head is provided by means of a back layer (soft magnetic layer) on the medium, just beneath the magnetic layer, with the easily magnetized axis aligned in the vertical direction. Since the hexagonal ferrite magnetic particles are oriented in the direction of thickness of the tape in the magnetic tape of the present invention, recording is conducted by means of the vertical component of the magnetic field of the leakage flux of a ring head. The recording head (recording head for longitudinal recording) that conducts recording on the magnetic tape of the present invention in a longitudinal recording method can be in the form of one that magnetizes in the longitudinal direction the hexagonal ferrite magnetic particles contained in the magnetic layer. Specific examples are a ring-shaped inductive head, and an inductive thin-film head equipped with an upper pole and a lower pole. A highly sensitive GMR head that detects both the longitudinal and vertical magnetic fields of the leakage field of the tape is desirably employed as a reproduction head.

The present invention further relates to a method of manufacturing a magnetic tape of the present invention. The method of manufacturing a magnetic tape of the present invention comprises preparing a coating liquid by dispersing a magnetic liquid containing a hexagonal ferrite powder, a binder, and a compound in which a substituent selected from the group consisting of a carboxyl group and a hydroxyl group is directly substituted into a ring structure comprising a double bond and having a ClogP falling within a range of 2.3 to 5.5, forming a magnetic layer by coating the coating liquid that has been prepared on a nonmagnetic support, and adjusting squareness in a vertical direction without demagnetizing field correction of the magnetic layer to within a range of 0.6 to 1.0 by implementing vertical orientation processing. The magnetic tape of the present invention can be manufactured by the above manufacturing method. In the magnetic liquid, as set forth above, it is desirable for the hexagonal ferrite powder, binder, and the compound to be added approximately simultaneously to an organic solvent, or for the hexagonal ferrite powder and binder to be premixed, after which the compound is added, with the latter form being preferred. That is, the magnetic liquid is desirably prepared by adding the compound to a mixture obtained by mixing hexagonal ferrite powder and binder. Other details regarding the method of manufacturing a magnetic tape of the present invention are as set forth above.

EXAMPLES

The present invention will be described in detail below based on Examples. However, the present invention is not limited to the examples. The "parts" given in Examples is weight parts unless specifically stated otherwise.

Example 1

Magnetic Layer Coating Liquid

| (Magnetic liquid) | | |
|---|---|---|
| Barium ferrite (average plate diameter 20 nm) | | 100 parts |
| SO$_3$Na group-containing polyurethane resin (molecular weight: 70,000; SO$_3$Na groups: 0.4 meq/g) | | 14 parts |
| Cyclohexanone | | 150 parts |
| Methyl ethyl ketone | | 150 parts |
| (Abrasive solutions) | | |
| Abrasive solution A | Alumina abrasive (average particle diameter: 100 nm) | 3 parts |
|  | Sulfonic acid group-containing polyurethane resin (molecular weight: 70,000, SO$_3$Na groups: 0.3 meq/g) | 0.3 part |
|  | Cyclohexanone | 26.7 parts |
| Abrasive solution B | Diamond abrasive (average particle diameter: 100 nm) | 1 part |
|  | Sulfonic acid group-containing polyurethane resin (molecular weight: 70,000, SO$_3$Na groups: 0.3 meq/g) | 0.1 part |
|  | Cyclohexanone | 26.7 parts |
| (Silica sol) | | |
| Colloidal silica (average particle diameter 100 nm) | | 0.2 part |
| Methyl ethyl ketone | | 1.4 parts |
| (Other components) | | |
| Additive (see Table 1) | | 5 parts |
| Stearic acid | | 2 parts |
| Butyl stearate | | 6 parts |
| Polyisocyanate (Coronate, Nippon Polyurethane | | 2.5 parts |

| -continued | |
|---|---|
| Industry Co., Ltd.) | |
| (Solvents added for finishing) | |
| Cyclohexanone | 200 parts |
| Methyl ethyl ketone | 200 parts |

Nonmagnetic Layer Coating Liquid

| | |
|---|---|
| Nonmagnetic inorganic powder: α-iron oxide | 100 parts |
| Average major axis length: 10 nm Average acicular ratio: 1.9 | |
| BET specific surface area: 75 m$^2$/g | |
| Carbon black | 25 parts |
| Average particle diameter 20 nm | |
| SO$_3$Na group-containing polyurethane resin | 18 parts |
| (molecular weight: 70,000; SO$_3$Na groups: 0.2 meq/g) | |
| Stearic acid | 1 part |
| Cyclohexanone | 300 parts |
| Methyl ethyl ketone | 300 parts |

Backcoat Layer Coaling Liquid

| | |
|---|---|
| Nonmagnetic inorganic powder: α-iron oxide | 80 parts |
| Average major axis length: 0.15 µm Average acicular ratio: 7 | |
| BET specific surface area: 52 m$^2$/g | |
| Carbon black | 20 parts |
| Average particle diameter 20 nm | |
| Vinyl chloride copolymer | 13 parts |
| Sulfonic acid group-containing polyurethane resin | 6 parts |
| Phenyl phosphonic acid | 3 parts |
| Cyclohexanone | 155 parts |
| Methyl ethyl ketone | 155 parts |
| Stearic acid | 3 parts |
| Butyl stearate | 3 parts |
| Polyisocyanate | 5 parts |
| Cyclohexanone | 200 parts |

The above magnetic liquid was dispersed for 24 hours using a batch-type vertical ball mill. Zirconia beads 0.5 mm in diameter were employed as a dispersion medium. Abrasive liquids A and B were separately dispersed for 24 hours in batch-type ultrasonic devices (20 kHz, 300 W). Following admixture of these dispersions to the other components (silica sol, other components, and solvents added for finishing), the mixture was processed for 30 minutes in a batch-type ultrasonic device (20 kHz, 300 W). Subsequently, the mixture was filtered with a filter having an average pore diameter of 0.5 µm to prepare the magnetic layer coating liquid.

For the nonmagnetic layer coating liquid, the various components were dispersed for 24 hours in a batch-type vertical sand mill. Zirconia beads 0.1 mm in diameter were employed as a dispersion medium. The dispersion obtained was filtered using a filter having an average pore diameter of 0.5 µm to prepare a nonmagnetic layer coating liquid.

For the backcoat layer coating liquid, the various components—excluding the lubricants (stearic acid and butyl stearate), polyisocyanate and 200 parts of cyclohexanone—were kneaded and diluted in an open kneader. Subsequently, a horizontal bead mill dispersing apparatus was employed to conduct 12 passes of dispersion processing, with each pass being set to a two-minute retention time at a rotor tip speed of 10 m/s and employing zirconia beads 1 mm in diameter at a bead fill rate of 80 percent. Next, the remaining components were added to the dispersion, and the mixture was stirred with a dissolver. The dispersion obtained was filtered with a filter having an average pore diameter of 1 µm to prepare a backcoat layer coating liquid.

Subsequently, the nonmagnetic layer coating liquid was coated and dried to a thickness of 100 nm on a polyethylene naphthalate support 5 μm in thickness (with a center line surface roughness (Ra value) of 1.5 nm as measured with a 20× objective lens with an optical 3D profilometer; a Young's modulus in the crosswise direction of 8 GPa, and a Young's modulus in the longitudinal direction of 6 GPa). Subsequently, the magnetic layer coating liquid was applied thereover in a quantity calculated to yield a dry thickness of 70 nm. While the magnetic layer coating liquid was still wet, a magnetic field with a field strength of 0.6 T was applied in a vertical direction to the coated surface in vertical orientation processing, after which the coating was dried. Subsequently, the backcoat layer coating liquid was coated and dried to a thickness of 0.4 μm on the opposite side of the support.

A calendar comprised of metal rolls was used to conduct a surface smoothing treatment at a rate of 100 m/minute, a linear pressure of 300 kg/cm, and a temperature of 100° C. A heat treatment was then conducted for 36 hours in a 70° C. dry environment. Following the heat treatment, the product was slit to ½ inch width to obtain a magnetic tape.

Examples 2 to 11, Comparative Examples 1 to 16

With the exceptions that the types of additives employed in the magnetic layer, the dispersion time of the magnetic liquid, and/or the orientation processing conditions were as indicated in Table 1, magnetic tapes were prepared by the same method as in Example 1.

Comparative Examples 17 to 22

With the exceptions that the magnetic powder was changed to the ferromagnetic metal powder indicated below, and the types of additives employed in the magnetic layer, the dispersion time of the magnetic liquid, and/or the orientation processing conditions employed were as indicated in Table 1, magnetic tapes were prepared by the same method as in Example 1. When employing ferromagnetic metal powder (average major axis length 30 nm, Hc 215 kA/m (approximately 2,700 Oe)) and conducting vertical orientation processing in the same manner as in Example 1, it was difficult to achieve squareness in the vertical direction falling within a range of 0.6 to 1.0.

Evaluation Methods (1) Particle Diameter in Liquid

To evaluate the dispersion state of the magnetic particles in the magnetic layer-forming coating liquid, a portion of the magnetic layer-forming coating liquid prepared as set forth above was collected and diluted to 1/50 based on weight using the same organic solvent as that employed to prepare the coating liquid to prepare a sample solution. The arithmetic average particle diameter of the sample solution thus prepared was measured with an LB500 (made by Horiba) light scattering particle size distribution analyzer as the particle diameter in liquid.

(2) Squareness

The squareness in the longitudinal direction and in the vertical direction of the magnetic layer was measured at an external magnetic field of 15 kOe with a vibrating sample magnetometer (VSM) and the ΔM was measured by the following method for each of the magnetic tapes prepared.

The residual magnetization Id (H) measured with DC demagnetization was measured by the following method. DC demagnetization was conducted to adjust the external magnetic field to 0 Oe. Subsequently, a magnetic field of 200 Oe (approximately 159 kA/m) was applied in the opposite direction from the direction of the magnetic field in DC demagnetization, the residual magnetization when returned to 0 Oe was denoted as Id (200 Oe), 200 Oe+200 Oe (400 Oe (approximately 318 kA/m)) was applied, and the residual magnetic field when returned to 0 Oe was denoted as Id (400 Oe). These operations were conducted at 200 Oe increments to increase the magnetic field. The residual magnetization Ir (H) starting from AC demagnetization was also measured conducting the same operation in 200 Oe increments. The magnitude of the absolute value (positive value) was adopted for all of the residual magnetizations, and the residual magnetization Ir (∞) was measured for an applied magnetic field of 10 kOe (796 kA/m). ΔM was obtained for the various magnetic fields from equation (1). The maximum absolute value was adopted as ΔM.

(4) SNR

A magnetic signal was recorded in the longitudinal direction of the tape and reproduced with an MR head under the conditions indicated below for each of the magnetic tapes prepared. The reproduction signal was frequency analyzed with a spectrum analyzer made by Shibasoku, and the ratio of the output at 300 kfci and the noise integrated over a range of 0 to 600 kfci was adopted as the SNR.

<Recording and Reproduction Conditions>
Recording: Recording track width 5 μm, recording gap 0.17 μm, head Bs 1.8 T
Reproduction: Reproduction track width 0.4 μm, sh-sh distance 0.08 μm
Recording wavelength: 300 kfi (5) Thermal Stability The output when recording and reproduction were conducted at a recording density of 200 kfci using the recording head and reproduction head described in (4) above was adopted as an initial value of 100 percent. The same track was reproduced two weeks later and the amount of drop in output was adopted as the demagnetizing factor denoted as a percentage.

The above results are given in Table 1.

TABLE 1

| | Magnetic material | Additive | ClogP (2.3-5.5) | Double bond in the ring structure | OH or COOH | Particle diameter in liquid (in the parentheses, dispersion period of the magnetic liquid) |
|---|---|---|---|---|---|---|
| Ex. 1 | BaFe | 2,3-dihydroxynaphthalene | Within the range (3.03) | Present | OH × 2 | 40 nm(24 h) |
| Ex. 2 | BaFe | 4-biphenylcarboxylic acid | Within the range (3.71) | Present | COOH | 42 nm(24 h) |
| Ex. 3 | BaFe | Anthraquinone-2-carboxylic acid | Within the range (2.42) | Present | COOH | 42 nm(24 h) |
| Ex. 4 | BaFe | 1-pyrenecarboxylic acid | Within the range (5.15) | Present | COOH | 41 nm(24 h) |

TABLE 1-continued

| | | | | | | |
|---|---|---|---|---|---|---|
| Ex. 5 | BaFe | 4-biphenylcarboxylic acid | Within the range (3.71) | Present | COOH | 42 nm(24 h) |
| Ex. 6 | BaFe | 4-biphenylcarboxylic acid | Within the range (3.71) | Present | COOH | 42 nm(24 h) |
| Ex. 7 | BaFe | 2,2'-biphenylcarboxylic acid | Within the range (3.71) | Present | COOH × 2 | 42 nm(24 h) |
| Ex. 8 | BaFe | 1-hydroxynaphthalene | Within the range (3.03) | Present | OH × 1 | 41 nm(24 h) |
| Ex. 9 | BaFe | 4-biphenylcarboxylic acid | Within the range (3.71) | Present | COOH | 55 nm(12 h) |
| Ex. 10 | BaFe | 4-biphenylcarboxylic acid | Within the range (3.71) | Present | COOH | 48 nm(12 h) |
| Ex. 11 | BaFe | 4-biphenylcarboxylic acid | Within the range (3.71) | Present | COOH | 42 nm(24 h) |
| Comp. Ex. 1 | BaFe | Benzoic acid | Without the range (2.03) | Present | COOH | 42 nm(24 h) |
| Comp. Ex. 2 | BaFe | Cyolohexanecarboxylic acid | Without the range (2.5) | Not present | COOH | 41 nm(24 h) |
| Comp. Ex. 3 | BaFe | 1,1'-bi-2-naphthol | Without the range (5.7) | Present | OH × 2 | 41 nm(24 h) |
| Comp. Ex. 4 | BaFe | 2-naphthalenesulfonic acid Na | Within the range (3.03) | Present | SO3Na | 50 nm(24 h) |
| Comp. Ex. 5 | BaFe | 4-biphenylcarboxylic acid | Within the range (3.71) | Present | COOH | 42 nm(24 h) |
| Comp. Ex. 8 | BaFe | 2,3-dihydroxynaphthalene | Within the range (3.03) | Present | OH | 40 nm(24 h) |
| Comp. Ex. 7 | BaFe | 4-biphenylcarboxylic acid | Within the range (3.71) | Present | COOH | 42 nm(24 h) |
| Comp. Ex. 8 | BaFe | Benzoic acid | Without the range (2.03) | Present | COOH | 42 nm(24 h) |
| Comp. Ex. 9 | BaFe | Cyolohexane | Without the range (2.5) | Not present | Not present | 41 nm(24 h) |
| Comp. Ex. 10 | BaFe | 2,3-dihydroxynaphthalene | Within the range (3.03) | Present | OH | 40 nm(24 h) |
| Comp. Ex. 11 | BaFe | 4-biphenylcarboxylic acid | Within the range (3.71) | Present | COOH | 42 nm(24 h) |
| Comp. Ex. 12 | BaFe | Benzoic acid | Without the range (2.03) | Present | COOH | 42 nm(24 h) |
| Comp. Ex. 13 | BaFe | Cyclohexane | Without the range (2.5) | Not present | x | 41 nm(24 h) |
| Comp Ex. 14 | BaFe | None | — | — | — | 42 nm(24 h) |
| Comp. Ex. 15 | BaFe | None | — | — | — | 42 nm(24 h) |
| Comp. Ex. 16 | BaFe | None | — | — | — | 42 nm(24 h) |
| Comp. Ex. 17 | MP | 2,3-dihydroxynaphthalene | Within the range (3.03) | Present | OH | 80 nm(24 h) |
| Comp. Ex. 18 | MP | 4-biphenylcarboxylic acid | Within the range (3.71) | Present | COOH | 80 nm(24 h) |
| Comp. Ex. 19 | MP | None | — | — | — | 80 nm(24 h) |
| Comp Ex. 20 | MP | 2,3-dihydroxynaphthalene | Within the range (3.03) | Present | OH | 80 nm(24 h) |
| Comp. Ex. 21 | MP | 4-biphenylcarboxylic acid | Within the range (3.71) | Present | COOH | 80 nm(24 h) |
| Comp. Ex. 22 | MP | None | — | — | — | 80 nm(24 h) |

| | Orientation direction (in the parentheses, intensity of magnetic field) | ΔM | Longitudinal SQ | Vertical SQ | Output | Noise | SNR | Thermal stability |
|---|---|---|---|---|---|---|---|---|
| Ex. 1 | Vertical(0.6 T) | −0.18 | 0.25 | 0.70 | 6.0 | 1 | 5.0 | 0% |
| Ex. 2 | Vertical(0.6 T) | −0.18 | 0.26 | 0.68 | 5.5 | 1 | 4.5 | 0% |
| Ex. 3 | Vertical(0.6 T) | −0.12 | 0.25 | 0.69 | 5.0 | 1 | 4.5 | 0% |
| Ex. 4 | Vertical(0.6 T) | −0.12 | 0.28 | 0.67 | 5.0 | 1 | 4.0 | 0% |
| Ex. 5 | Vertical(1 T) | −0.15 | 0.15 | 0.90 | 8.0 | 2 | 6.0 | 0% |
| Ex. 6 | Vertical(0.2 T) | −0.10 | 0.35 | 0.60 | 4.5 | 0.5 | 4.0 | 0% |
| Ex. 7 | Vertical(0.6 T) | −0.10 | 0.25 | 0.70 | 6.0 | 1 | 5.0 | 0% |
| Ex. 8 | Vertical(0.6 T) | −0.12 | 0.25 | 0.69 | 5.5 | 1 | 4.5 | 0% |
| Ex. 9 | Vertical(0.6 T) | −0.04 | 0.26 | 0.62 | 4.6 | 1 | 3.6 | −1% |
| Ex. 10 | Vertical(0.6 T) | −0.06 | 0.26 | 0.66 | 4.6 | 1 | 3.6 | 0% |
| Ex. 11 | Vertical(1.2 T) | −0.27 | 0.26 | 0.76 | 6.0 | 2 | 4.0 | 0% |
| Comp. Ex. 1 | Vertical(0.6 T) | −0.06 | 0.26 | 0.69 | 5.5 | 5 | 0.5 | −3% |
| Comp. Ex. 2 | Vertical(0.6 T) | −0.05 | 0.25 | 0.70 | 5.5 | 5 | 0.5 | −3% |
| Comp. Ex. 3 | Vertical(0.6 T) | −0.04 | 0.25 | 0.70 | 5.5 | 5 | 0.5 | −3% |
| Comp. Ex. 4 | Vertical(0.6 T) | −0.01 | 0.30 | 0.65 | 5.0 | 6 | −1.0 | −3% |
| Comp. Ex. 5 | Vertical(0.3 T) | −0.03 | 0.40 | 0.55 | 3.0 | 2 | 1.0 | −2% |
| Comp. Ex. 8 | Longitudinal(0.8 T) | 0.12 | 0.80 | 0.40 | 2.0 | 3 | 0 | −1% |
| Comp. Ex. 7 | Longitudinal(0.6 T) | 0.12 | 0.75 | 0.45 | 1.5 | 2 | 0 | −1% |
| Comp. Ex. 8 | Longitudinal(0.6 T) | 0.06 | 0.80 | 0.40 | 2.0 | 3 | 0 | −3% |
| Comp. Ex. 9 | Longitudinal(0.6 T) | 0.05 | 0.75 | 0.45 | 1.5 | 2 | 0 | −3% |
| Comp. Ex. 10 | No orientation | 0.04 | 0.38 | 0.55 | −0.5 | 0 | −0.5 | −8% |
| Comp. Ex. 11 | Longitudinal(0.6 T) | 0.04 | 0.38 | 0.55 | −0.5 | 0 | −0.5 | −8% |

TABLE 1-continued

| | | | | | | | | |
|---|---|---|---|---|---|---|---|---|
| Comp. Ex. 12 | Longitudinal(0.6 T) | 0.03 | 0.38 | 0.55 | −0.5 | 0 | −0.5 | −7% |
| Comp. Ex. 13 | Longitudinal(0.6 T) | 0.03 | 0.38 | 0.55 | −0.5 | 0 | −0.5 | −7% |
| Comp Ex. 14 | Vertical(0.6 T) | −0.07 | 0.25 | 0.68 | 5.5 | 5 | 0.5 | −6% |
| Comp. Ex. 15 | Longitudinal(0.6 T) | 0.06 | 0.75 | 0.45 | 2.5 | 2 | 0.5 | −5% |
| Comp. Ex. 16 | No orientation | −0.02 | 0.38 | 0.55 | 0 | 0 | 0 | −7% |
| Comp. Ex. 17 | Longitudinal(0.6 T) | −0.08 | 0.85 | 0.30 | 8.0 | 12 | −4.0 | −10% |
| Comp. Ex. 18 | Longitudinal(0.6 T) | −0.08 | 0.85 | 0.30 | 8.0 | 12 | −4.0 | −10% |
| Comp. Ex. 19 | Longitudinal(0.6 T) | −0.08 | 0.85 | 0.30 | 8.0 | 12 | −4.0 | −10% |
| Comp Ex. 20 | No orientation | −0.03 | 0.64 | 0.30 | 4.0 | 10 | −6.0 | −10% |
| Comp. Ex. 21 | Longitudinal (0.6 T) | −0.03 | 0.64 | 0.30 | 4.0 | 10 | −6.0 | −10% |
| Comp. Ex. 22 | Longitudinal (0.6 T) | −0.03 | 0.64 | 0.30 | 4.0 | 10 | −6.0 | −10% |

BaFe: Barium ferrite
MP: Metal powder

Based on the results shown in Table 1, the present invention was confirmed to achieve both high thermal stability and a good SNR.

The magnetic tape of the present invention is suitable as a data backup tape of which high reliability and good electromagnetic characteristics are required for extended periods.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior

What is claimed is:

1. A magnetic tape comprising a magnetic layer containing a ferromagnetic powder and a binder on a nonmagnetic support, wherein
    the ferromagnetic powder is a hexagonal ferrite powder,
    squareness in a vertical direction without demagnetizing field correction of the magnetic layer ranges from 0.6 to 1.0,
    the magnetic layer further comprises a compound in which a substituent selected from the group consisting of a carboxyl group and a hydroxyl group is directly substituted into a ring structure comprising a double bond and having a ClogP falling within a range of 2.3 to 5.5, and has a negative value of a magnetic interaction, ΔM, calculated by equation (1) below:

$$\Delta M = (Id(H) + 2Ir(H) - Ir(\infty))/Ir(\infty) \quad (1)$$

wherein in equation (1), Id(H) denotes residual magnetization measured with DC demagnetization, Ir(H) denotes residual magnetization measured with AC demagnetization, and Ir(∞) denotes residual magnetization measured at an applied magnetic field of 796 kA/m (10 kOe).

2. The magnetic tape according to claim 1, which is a longitudinal recording magnetic tape.

3. The magnetic tape according to claim 1, wherein the magnetic layer has the ΔM of equal to or less than −0.05.

4. The magnetic tape according to claim 1, wherein the ring structure is selected from the group consisting of a naphthalene ring, a biphenyl ring, an anthracene ring, and a pyrene ring.

5. The magnetic tape according to claim 1, wherein the compound is selected from the group consisting of dihydroxynaphthalene, biphenylcarboxylic acid, anthraquinonecarboxylic acid, pyrenecarboxylic acid, and hydroxynaphthalene.

6. The magnetic tape according to claim 1, wherein the average plate diameter of the hexagonal ferrite powder ranges from 10 nm to 30 nm.

7. The magnetic tape according to claim 1, wherein the magnetic layer comprises the compound in a quantity of 1 to 20 mass parts per 100 mass parts of the hexagonal ferrite powder.

8. A method of manufacturing a magnetic tape, wherein the magnetic tape is the magnetic tape according to claim 1, and the method comprises:
    preparing a coating liquid by dispersing a magnetic liquid containing a hexagonal ferrite powder, a binder, and a compound in which a substituent selected from the group consisting of a carboxyl group and a hydroxyl group is directly substituted into a ring structure comprising a double bond and having a ClogP falling within a range of 2.3 to 5.5,
    forming a magnetic layer by coating the coating liquid that has been prepared on a nonmagnetic support, and
    adjusting squareness in a vertical direction without demagnetizing field correction of the magnetic layer to within a range of 0.6 to 1.0 by implementing vertical orientation processing.

9. The method of manufacturing a magnetic tape according to claim 8, which further comprises preparing the magnetic liquid by preparing a mixture of a hexagonal ferrite powder and a binder and adding the compound to the mixture.

10. A magnetic recording device, which comprises the magnetic tape according to claim 1 and a longitudinal recording magnetic head.

* * * * *